(12) United States Patent
Seto et al.

(10) Patent No.: US 8,780,390 B2
(45) Date of Patent: Jul. 15, 2014

(54) IMAGE EDITING APPARATUS, IMAGE EDITING METHOD, AND RECORDING MEDIUM

(75) Inventors: Satoshi Seto, Tokyo (JP); Motoshige Asano, Tokyo (JP); Natsuko Yoshimura, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 374 days.

(21) Appl. No.: 13/109,801

(22) Filed: May 17, 2011

(65) Prior Publication Data
US 2011/0286040 A1  Nov. 24, 2011

(30) Foreign Application Priority Data
May 18, 2010 (JP) ................. 2010-114137

(51) Int. Cl.
G06F 15/00 (2006.01)
(52) U.S. Cl.
USPC ......... 358/1.15; 358/1.13; 358/1.9; 358/1.14; 347/43; 715/740
(58) Field of Classification Search
None
See application file for complete search history.

(56) References Cited

U.S. PATENT DOCUMENTS

| 5,857,209 | A | 1/1999 | Shively | |
|---|---|---|---|---|
| 6,241,339 | B1 * | 6/2001 | Kondo | 347/43 |
| 7,142,318 | B2 * | 11/2006 | Lopez et al. | 358/1.15 |
| 7,283,276 | B2 * | 10/2007 | Tacke | 358/1.18 |
| 8,132,106 | B2 * | 3/2012 | Low et al. | 715/740 |
| 2005/0275879 | A1 | 12/2005 | Ogasawara | |
| 2006/0114490 | A1 | 6/2006 | Rolleston | |
| 2007/0008566 | A1 | 1/2007 | Leone, III et al. | |
| 2007/0268513 | A1 | 11/2007 | Enloe | |
| 2008/0037066 | A1 | 2/2008 | Sauer | |

FOREIGN PATENT DOCUMENTS

| EP | 1191432 A2 | 3/2002 |
|---|---|---|
| EP | 1191432 A3 | 9/2004 |
| JP | 2001-216111 A | 8/2001 |
| JP | 2004-102614 A | 4/2004 |
| JP | 2005-339250 A | 12/2005 |
| JP | 2006-185437 A | 7/2006 |
| JP | 2008-302518 A | 12/2008 |
| WO | WO 2009/024734 A1 | 2/2009 |

OTHER PUBLICATIONS

European Office Action, dated May 27, 2013, for Patent Application No. 11166507.1.
Extended European Search Report for European Application No. 11166507.1, dated Sep. 20, 2012.
Office Action dated Nov. 12, 2013, issued in corresponding European Patent Application No. 11166507.1.

(Continued)

Primary Examiner — Ashish K Thomas
(74) Attorney, Agent, or Firm — Birch, Stewart, Kolasch & Birch, LLP

(57) ABSTRACT

Page description language data are imposed according to entered imposition information. The imposed page description language data are converted into raster-format data by an RIP process. Page data depending on a plurality of page areas are clipped from the raster-format data. The clipped page data are mapped onto respective model areas corresponding to the page areas on a determined three-dimensional shape model thereby to generate three-dimensional preview data of a print. A three-dimensional preview image of the print is displayed based on the three-dimensional preview data.

14 Claims, 17 Drawing Sheets

(56) References Cited

OTHER PUBLICATIONS

Japanese Office Action dated Dec. 3, 2013 issued in corresponding Japanese Patent Application No. 2010-114137 (English translation is provided).

European Office Action, dated May 8, 2014, for European Application No. 11166507.1.

* cited by examiner

IMAGE EDITING APPARATUS, IMAGE EDITING METHOD, AND RECORDING MEDIUM

CROSS-REFERENCE TO RELATED APPLICATION

This application is based upon and claims the benefit of priority from Japanese Patent Application No. 2010-114137 filed on May 18, 2010, of which the contents are incorporated herein by reference.

BACKGROUND OF THE INVENTION

1. Field of the Invention

The present invention relates to an image editing apparatus, an image editing method, and a recording medium.

2. Description of the Related Art

In recent years, the CTP (Computer To Plate) technology for directly producing printing plates from electronic data without the need for any intermediate mediums and processes has been in widespread use in the printing and platemaking field. There have been proposed various proofreading assistance tools for performing an efficient proofreading process using electronic data for CTP.

The proofreading process includes a task for confirming print presentation forms in which prints are presented. Specific print presentation forms to be confirmed include layout, imposition, page folding, page trimming position, etc. In order to facilitate the confirming task, various efforts have been made for displaying printing data images in view of those print presentation forms.

For example, Japanese Laid-Open Patent Publication No. 2008-302518 discloses an apparatus and method for combining a template image which shows page folding details with printing data image into a preview image and displaying the preview image. The publication states that the displayed preview image allows the operator to confirm beforehand the layout of printed images on folded pages.

Japanese Laid-Open Patent Publication No. 2004-102614 discloses an apparatus and method for displaying a preview of a layout of printing data images and an output form thereof. The publication states that the displayed preview reflects various printing functions.

After the operator has completed a proofreading process, the operator is required in some cases to ask the client for approval before proceeding to a next printing process. At this time, the client visually checks a proof printed on a proof press to determine whether to go ahead with the printing process or not. There is a potential need for confirmation of a proof in a state that is as close to a final print as possible.

The apparatus and methods disclosed in Japanese Laid-Open Patent Publication No. 2008-302518 and Japanese Laid-Open Patent Publication No. 2004-102614 mainly serve to simply confirm imposition and page folding in particular, and do not use actual printing data (block copy data). According to the disclosed apparatus and methods, therefore, the proof tends to deviate from the final print. The disclosed apparatus and methods do not lend themselves to final confirmation of other forms including layout and page trimming.

SUMMARY OF THE INVENTION

It is an object of the present invention to provide an image editing apparatus, an image editing method, and a recording medium which are capable of predicting print presentation forms highly accurately and of greatly increasing the efficiency of a proofreading process.

According to the present invention, there is provided an image editing apparatus comprising an imposition information acquirer for acquiring imposition information for a print to be printed based on page description language data, an imposition processor for imposing the page description language data to generate imposition data according to the imposition information acquired by the imposition information acquirer, a RIP processor for performing a RIP process on the imposition data generated by the imposition processor to convert the imposition data into raster-format data, a page clipping processor for clipping page data corresponding respectively to a plurality of page areas from the raster-format data converted by the RIP processor, a shape model determiner for determining a three-dimensional shape model for the print, a preview data generator for mapping the page data clipped by the page clipping processor onto respective model areas corresponding to the page areas on the three-dimensional shape model determined by the shape model determiner thereby to generate a three-dimensional preview data of the print, and a display unit for displaying a three-dimensional preview image of the print based on the three-dimensional preview data generated by the preview data generator.

As described above, the image editing apparatus includes the page clipping processor for clipping page data corresponding respectively to a plurality of page areas from the raster-format data, a shape model determiner for determining a three-dimensional shape model for the print, and the preview data generator for mapping the page data clipped by the page clipping processor onto respective model areas corresponding to the page areas on the determined three-dimensional shape model thereby to generate three-dimensional preview data of the print. Accordingly, it is possible to generate and display a preview image under conditions close to block copy data and print presentation forms with which to actually produce the print, so that the print presentation forms of the print can be predicted accurately. The efficiency of the proofreading process is thus greatly increased.

Preferably, the image editing apparatus further comprises a page selector for selecting at least one page from pages represented by the imposition data, and the display unit displays the three-dimensional preview image by displaying an image representing page data of the at least one page selected by the page selector and by not displaying an image representing page data of the remaining pages.

Preferably, the pages represented by the imposition data are provided on a plurality of signatures, and the page selector selects the at least one page from the overall pages, the pages on the signatures, or the signatures.

Preferably, the image editing apparatus further comprises a bleed selector for selecting whether a bleed area is to be displayed in the three-dimensional preview image or not, and the display unit displays the three-dimensional preview image by displaying or not displaying the bleed area depending on a selected result from the bleed selector.

Preferably, the page clipping processor clips the page data which include bleed area regardless of the selected result from the bleed selector, and the preview data generator generates the three-dimensional preview data which include or do not include the bleed area depending on the selected result from the bleed selector.

Preferably, the image editing apparatus further comprises a gradation display process selector for selecting one of gradation display processes including continuous tone display or separate color plate display, and the display unit displays the three-dimensional preview image based on the continuous tone display or the separate color plate display depending on the selected result from the bleed selector.

Preferably, the gradation display process selector further selects at least one of a C plate, an M plate, a Y plate, a K plate, and special color plates used for the separate color plate display.

Preferably, the gradation display process selector further selects a plurality of color plates, and the display unit displays the three-dimensional preview image in which the color plates are superposed.

Preferably, the preview data generator adjusts the three-dimensional shape model depending on the imposition information.

Preferably, the preview data generator converts the page data according to a prescribed resolution.

Preferably, the page clipping processor divides page description language data having a large size exceeding a prescribed page area into the page data, and clips the page data.

Preferably, the image editing apparatus further comprises a dividing position calculator for calculating the number and positions of boundary lines by which the page description language data having the large size are to be divided, based on the imposition information, and the page clipping processor clips the page data according to the positions of the boundary lines which are calculated by the dividing position calculator.

Preferably, the image editing apparatus further comprises a dividing position adjuster for adjusting the positions of the boundary lines.

According to the present invention, there is also provided an image editing method comprising the steps of acquiring imposition information for a print to be printed based on page description language data, imposing the page description language data to generate imposition data according to the acquired imposition information, performing a RIP process on the generated imposition data to convert the imposition data into raster-format data, clipping page data corresponding respectively to a plurality of page areas from the raster-format data, determining a three-dimensional shape model for the print depending on print presentation, mapping the clipped page data onto respective model areas corresponding to the page areas on the determined three-dimensional shape model thereby to generate three-dimensional preview data of the print, and displaying a three-dimensional preview image of the print based on the generated three-dimensional preview data.

According to the present invention, there is further provided a recording medium storing a program to be executed by a computer, the program enabling the computer to function as an imposition information acquirer for acquiring imposition information for a print to be printed based on page description language data, an imposition processor for imposing the page description language data to generate imposition data according to the imposition information acquired by the imposition information acquirer, a RIP processor for performing a RIP process on the imposition data generated by the imposition processor to convert the imposition data into raster-format data, a page clipping processor for clipping page data corresponding respectively to a plurality of page areas from the raster-format data produced by the RIP processor, a shape model determiner for determining a three-dimensional shape model for the print, and a preview data generator for mapping the page data clipped by the page clipping processor onto respective model areas corresponding to the page areas on the three-dimensional shape model determined by the shape model determiner thereby to generate three-dimensional preview data of the print.

With the image editing apparatus, the image editing method, and the recording medium according to the present invention, page data of a plurality of page areas are clipped from raster-format data, and the clipped page data are mapped onto respective model areas corresponding to the page areas on the three-dimensional shape model of a print, thereby generating three-dimensional preview data of the print. Accordingly, it is possible to generate and display a preview image under conditions close to block copy data and print presentation forms with which to actually produce the print, so that the print presentation forms of the print can be predicted accurately. The efficiency of the proofreading process is thus greatly increased.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

An image editing method according to a preferred embodiment of the present invention in relation to an image editing apparatus and a printing system which carry out the image editing method will be described in detail below with reference to the accompanying drawings.

Figure 1:
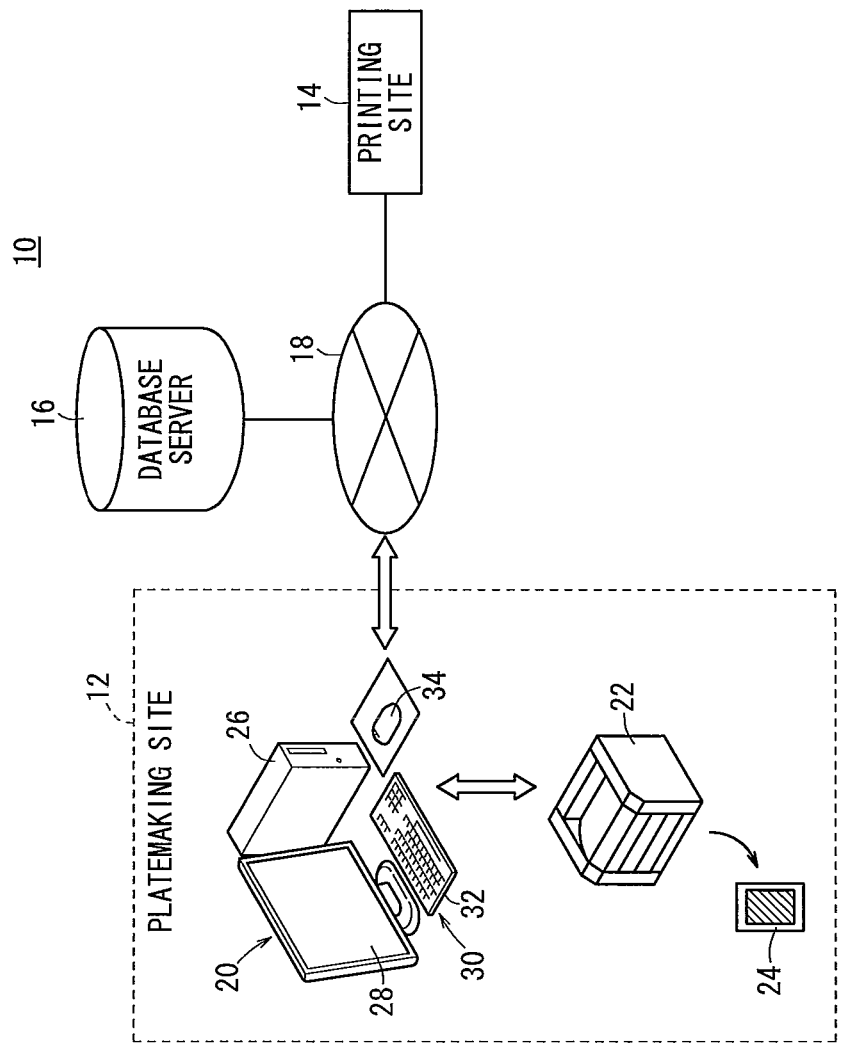
FIG. 1 is a schematic view of a printing system incorporating an image editing apparatus according to an embodiment of the present invention.

FIG. 1 is a schematic view of a printing system 10 incorporating an image editing apparatus 20 according to an embodiment of the present invention.

As shown in FIG. 1, the printing system 10 basically comprises a platemaking site 12, a printing site 14, a database server 16, and a LAN 18. The platemaking site 12 includes an image editing apparatus 20 and a proof press 22.

The image editing apparatus 20 generates platemaking data in a page description language (hereinafter referred to as "PDL") or edited data in an editing process, e.g., PDL-format data in color channels of four colors (CMYK) or three colors (RGB).

The PDL refers to a language which is descriptive of image information including documentary information, positional information, color information (including density information), etc. of characters, figures, etc. in a "page" that serves as an output unit for printing, displaying, or the like. Known types of the PDL include PDF (Portable Document Format according to ISO32000-1:2008), PostScript (registered trademark) of AdobeSystems, and XPS (XML Paper Specification).

The image editing apparatus 20 have various functions to perform desired image processing processes including, for example, a preflight process, a color conversion process, a layout process, etc. on PDL-format data to convert the PDL-format data into raster-format image data, e.g., bitmap or TIFF image data, further convert the raster-format image data into a printing control signal that matches the printing process of the proof press 22, and send the printing control signal to the proof press 22.

The image editing apparatus 20 displays a 3D image (three-dimensional image) of a virtual print on a display unit 28. The virtual print refers to a hypothetical print whose page data can be browsed in a format as an actually bound book. According to the present embodiment, images generated by three-dimensional computer graphics (hereinafter referred to as "3DCG") are displayed as 3D images on the display unit 28 by the image editing apparatus 20. However, other types of 3D images, e.g., stereoscopic images, may also be displayed on the display unit 28 by the image editing apparatus 20. For processing stereoscopic images, the image editing apparatus 20 may perform known image processing technologies suitable for various processes including a juxtaposition process, an image separation process, a parallax barrier, a polarization display process, etc.

The image editing apparatus 20 includes a main unit 26, the display unit 28, and an input unit 30 including a keyboard 32 and a mouse 34. The mouse 34 as a pointing device may be replaced with a track pad or a track ball.

The proof press 22 is an output device for producing a proof print 24 to be proofread. The proof press 22 may comprise a DDCP (Direct Digital Color Proofer) which is equivalent in performance to an offset press, an ink jet color proofer, a low-resolution color laser printer (electrophotographic printer), an ink jet printer, or the like.

The database server 16 is a server that stores and manages platemaking data files (TIFF files and PDF files) which have been proofread and job tickets {e.g., JDF (Job Definition Format) files}.

The LAN 18 is a network constructed according to communication standards such as Ethernet (registered trademark) or the like. The platemaking site 12, the printing site 14, the database server 16, and the LAN 18 are connected to each other by the LAN 18. The platemaking site 12 and the printing site 14 are located in different working fields, so that a platemaking process in the platemaking site 12 and a printing process in the printing site 14 are related to each other through the LAN 18.

The printing site 14 includes an image processing device for performing a desired image processing process on a platemaking data file acquired from the database server 16, a platesetter for creating printing plates, and an offset press, a digital printing press, or the like for printing desired color and monochromatic images on various mediums.

Figure 2:
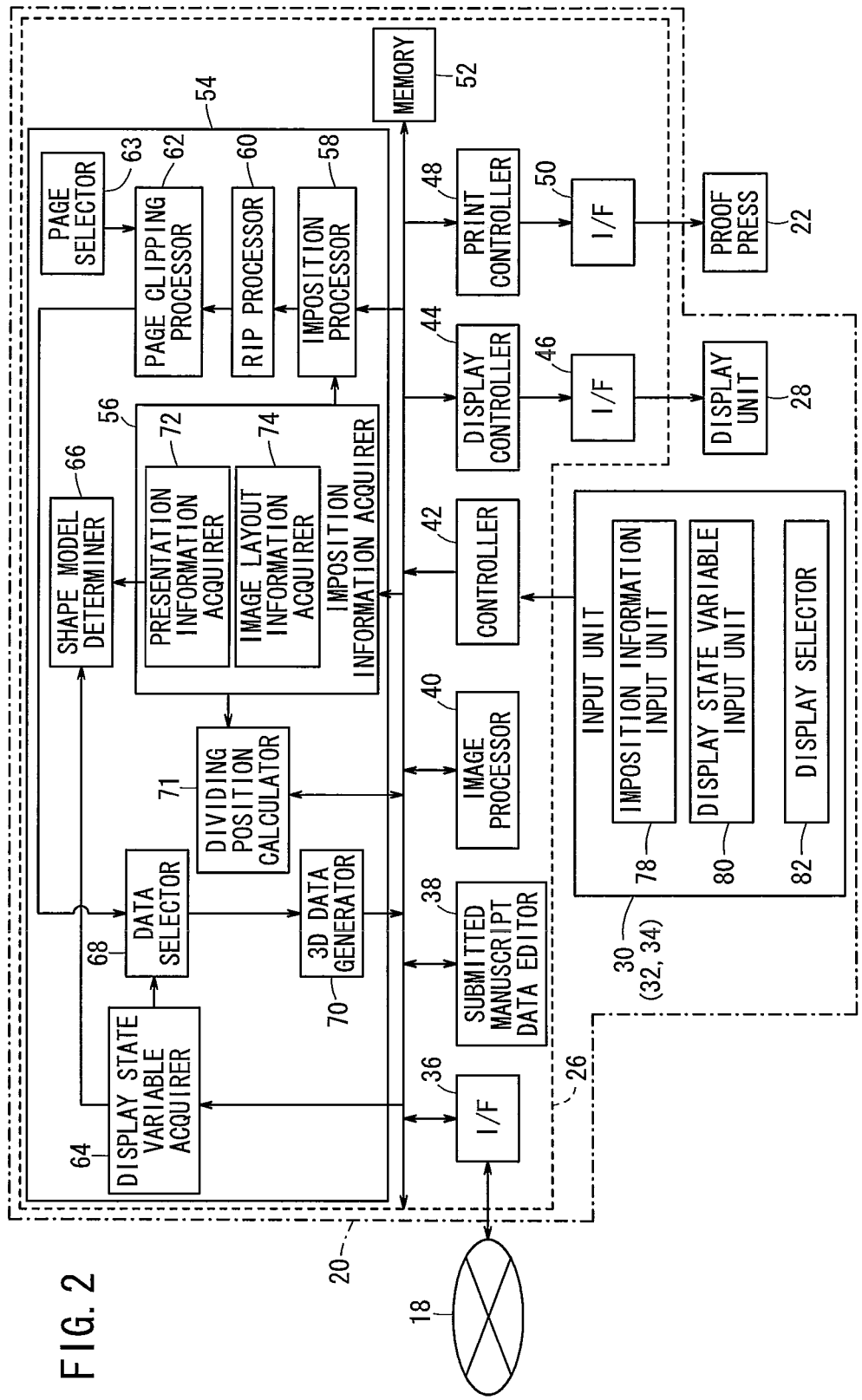
FIG. 2 is a functional block diagram of the image editing apparatus shown in FIG. 1.

FIG. 2 is a functional block diagram of the image editing apparatus 20 shown in FIG. 1.

As shown in FIG. 2, the main unit 26 comprises an I/F 36, a submitted manuscript data editor 38, an image processor 40, a controller 42, a display controller 44, an I/F 46, a print controller 48, an I/F 50, a memory 52, and a display data generator 54.

The submitted manuscript data editor 38 can perform various processes including a preflight process, a color adjusting process, etc. on one or more submitted manuscript data files, to generate pages of edited data. The submitted manuscript data editor 38 also generates imposition data by imposing pages of edited data according to a binding process and a page folding process which have been designated. The submitted manuscript data editor 38 can also correct imposition data based on the results of a proof print.

The image processor 40 has a RIP (Raster Imaging Processor) function to convert pages of edited data (PDL-format data) into raster-format data.

The controller 42 may comprise a processor such as a CPU. The controller 42 controls various parts of the main unit 26 which include the image processor 40, the display controller 44, the display data generator 54, etc.

The display controller 44 comprises a control circuit for controlling the display unit 28 under the control of the controller 42. Specifically, when the display controller 44 outputs a display control signal via the I/F 46 to the display unit 28, the display unit 28 is controlled to display images.

The print controller 48 comprises a control circuit for controlling the proof press 22 under the control of the controller 42. Specifically, when the print controller 48 outputs a print control signal via the I/F 50 to the proof press 22, the proof press 22 is controlled to print a proof print 24.

The memory 52 stores programs and data which are required for the controller 42 to control various parts, e.g., data required for the display data generator 54 to perform various processing processes, and also stores edited data files. The memory 52 may comprise a recording medium such as a nonvolatile memory, a hard disk, or the like.

The display data generator 54 comprises an imposition information acquirer 56, an imposition processor 58, a RIP processor 60, a page clipping processor 62, a page selector 63, a display state variable acquirer 64, a shape model determiner 66, a data selector 68, a 3D data generator 70 (preview data generator), and a dividing position calculator 71.

The imposition information acquirer 56 acquires various information required for an imposing process (hereinafter referred to as "imposition information"). The imposition information acquirer 56 includes a presentation information acquirer 72 for acquiring print presentation information for prints and an image layout information acquirer 74 for acquiring image layout information to be used for imposition.

The presentation information includes information about the total number of pages of a print, a binding process, a page folding process, etc. Modes of imposition based on combinations of the total numbers of pages, binding processes, page folding processes, etc. will hereinafter be referred to as "imposition patterns". Imposition patterns for producing books include sheetwise imposition (horizontal fold-back, vertical fold-back), half-sheet work, work and tumble, etc. Imposition patterns for producing pamphlets include letter fold, double parallel fold, accordion fold, spiral fold, baronial fold, gate fold, etc.

The image layout information includes layout information representing imposition and page sizes, bleed, gutter, pager number, etc.

The imposition processor 58 generates information representing an association between the page numbers of an imposition pattern and respective page data (hereinafter referred to as "page association information"). The page data and the page association information will be referred to altogether as "imposition data".

The RIP processor 60 performs a RIP process on imposition data to convert the imposition data into raster-format data (hereinafter after referred to as "RIP-processed imposition data"). Specifically, the RIP processor 60 places pages of edited data in respective data areas based on the image layout information, adds mark information such as register mark information, and rasterizes the edited data into RIP-processed imposition data. The RIP processor 60 may perform its image processing process using the RIP function of the image processor 40 described above.

The page clipping processor 62 clips page data corresponding to a plurality of page areas from the RIP-processed imposition data. The page data refer to image data of pages which are obtained by actually cutting a print.

The page selector 63 selects whether image contents of the page data are to be displayed or not (or to be not displayed or not) on a 3D preview image described later.

The display state variable acquirer 64 acquires various variables (hereinafter referred to as "display state variables") for displaying a virtual print 102 (see FIG. 4A, for example) in 3DCG.

The shape model determiner 66 determines a 3D shape model of a print to be printed. The 3D shape model refers to a three-dimensional model of the virtual print 102 in a presentation form. The presentation form refers to a final presentation form of a print that is printed on paper. The presentation form includes not only a book composition which needs binding, but also a job (a single sheet) such as a spreadable pamphlet which needs no binding.

The data selector 68 selects at least one page data from data of a plurality of pages to be applied to a given model area on the virtual print 102.

The 3D data generator 70 generates 3D preview data of the virtual print 102 according to a predetermined 3D shape model. For example, the 3D data generator 70 determines plot data representing a profile or shape, and generates 3D preview data for displaying the virtual print 102 according to a texture mapping process which maps image data within a grid-like area where the plot data are at its vertexes. The texture mapping process may be carried out according to any of various known algorithms.

If a plurality of plot data sets are prepared in advance and 3D preview data are generated from successive plot data at a rate of 30 frames per second and displayed, then the virtual print 102 is displayed in motion. All the plot data used to generate the 3D preview data may be stored in the memory 52 in advance. Alternatively, plot data representing only a profile (wire frame) are prepared, and frames of plot data may be calculated according to interpolation or using approximate curves, after which the plot data may be processed to generate 3D preview data.

The dividing position calculator 71 calculates the number of boundary lines and the positions of the boundary lines for dividing large-size PDL data into PDL data for pages.

The input unit 30 functions as an imposition information input unit 78 (dividing position adjuster) for entering imposition information, a display state variable input unit 80 for entering display state variables, and a display selector 82 (bleed selector, gradation display process selector) for selecting any various display processes.

The image editing apparatus 20 is constructed as described above. The image processing functions described above of the image editing apparatus 20 can be realized by application programs that are stored in the memory 52, which are run on basic software (operating system).

The printing system 10 according to the present embodiment is basically constructed as described above. Operation of the printing system 10 will be described below with reference to a flowchart shown in FIG. 3 and the functional block diagram shown in FIG. 2.

The platemaking process in the platemaking site 12 (see FIG. 1) comprises steps S1 through S8. In the present embodiment, an editing process will mainly be described below.

The operator submits manuscript data and has the manuscript data edited (step S1). The image editing apparatus 20 edits data files submitted from the client into imposition data, and stores the imposition data as files in the memory 52. Details of the editing operation of the image editing apparatus 20 will be described later.

Then, the operator produces a proof print based on the imposition data generated in step S1 (step S2).

Specifically, in response to a print instruction from the operator, the image processor 40 converts the imposition data (PDL-format data) acquired from the memory 52 into raster-format data. The print controller 48 then converts the raster-format data into a print control signal. The proof press 22 acquires the print control signal via the I/F 50, and prints color and monochromatic images on a medium, not shown, based on the print control signal, producing a proof print 24. At this time, the proof press 22 may adjust colors of the proof print 24 according to the known color matching technology so as to conform to printing colors in the printing site 14.

Then, the operator visually checks the proof print 24 to confirm whether it contains any areas to be corrected or not (step S3). If the operator finds an area to be corrected, then the operator makes a note of the area to be corrected and correction details on the proof print 24. If necessary, the operator corrects the imposition data (step S4). The submitted manuscript data editor 38 changes the contents of the imposition data according to the changing instruction from the operator. The memory 52 stores the corrected data as a new imposition data file.

If the correcting process for the area to be corrected that was found in step S3 is completed, then control returns to step S2 in which the proof press 22 produces a proof print 24 again (step S2). When the proof press 22 produces a proof print 24 this time, it uses the new imposition data file stored in step S4. The operator repeats steps S2 through S4 until the areas to be corrected in the imposition data are eliminated. When the proofreading process is finished, the data contents of the imposition data file are finalized.

Then, an approver gives a final confirmation in a 3D preview (step S5). The approver may be not only the operator who carries out steps S1 through S4, but also the client who has ordered the printing job. In the present embodiment, the approver gives a final confirmation on a 3D preview that is displayed on a display device (e.g., the display unit 28) connected to a terminal device (e.g., the image editing apparatus 20), rather than on the proof print 24.

Alternatively, the imposition data file may be uploaded in advance to the database server 16. For example, application software having the function of the display data generator 54 (see FIG. 2) is installed in advance in a terminal device, not shown, that is connected to the LAN 18. The approver can download the imposition data file from the non-illustrated terminal device that is connected to the LAN 18, and can browse a 3D preview based on the downloaded imposition data file. Further alternatively, a 3D viewer or 3D display data may be sent and received using a mail function, FTP, a file server, or the like.

Figure 4A:
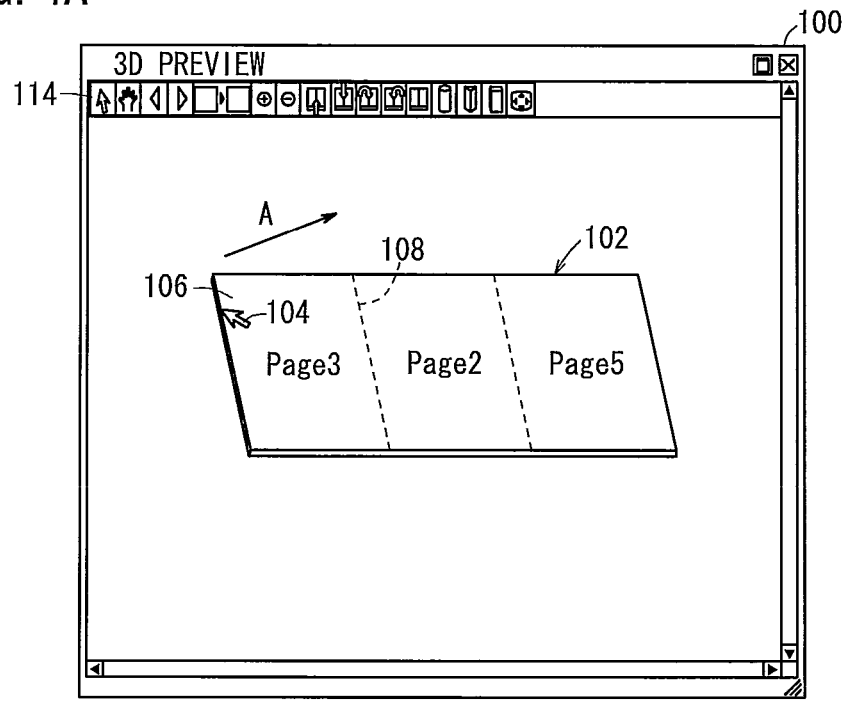
FIGS. 4A and 4B are schematic views showing a first change in a 3D preview screen of a virtual print.
Figure 4B:
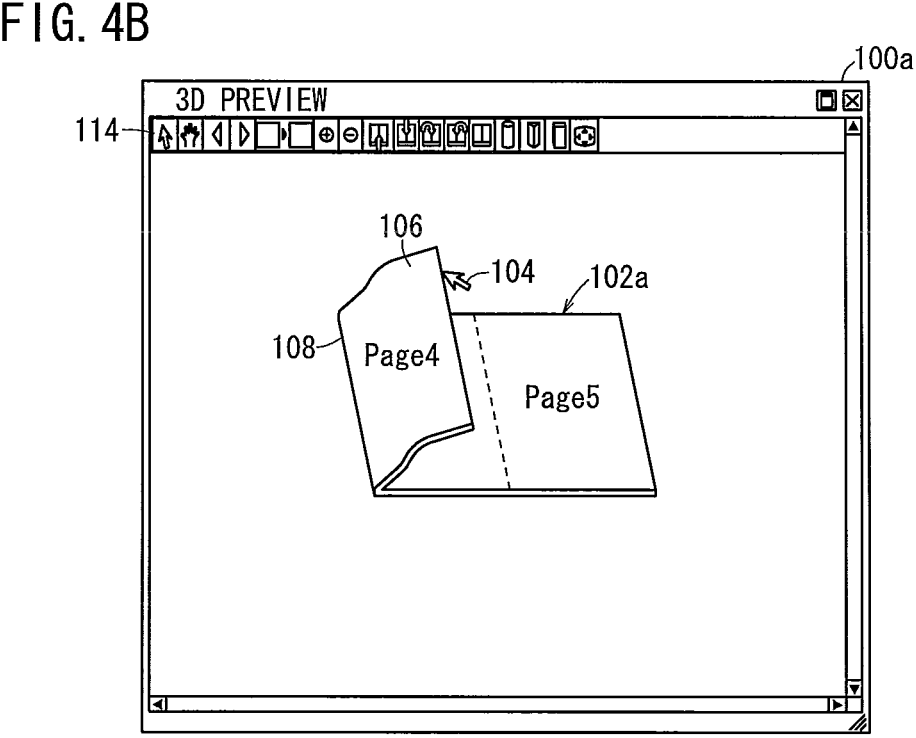

FIG. 4A shows an initial state of a preview screen 100. The preview screen 100 displays a virtual print 102 which is not folded and has a face side facing upwardly. A pointer 104 points to a certain location (e.g., a left end 106) on the virtual print 102 displayed by the preview screen 100. When the approver drags the mouse 34 along the direction indicated by the arrow A while pressing a certain key (e.g., a shift key) of the keyboard 32, the virtual print 102 changes in shape with the left end 106 following the pointer 104. Specifically, as shown in FIG. 4B, the virtual print 102 changes to a displayed state in which the virtual print 102 has its left base folded onto the face side (inner side) about a fold line 108, so that a new virtual print 102*a* is displayed on a preview screen 100*a*.

Figure 5A:
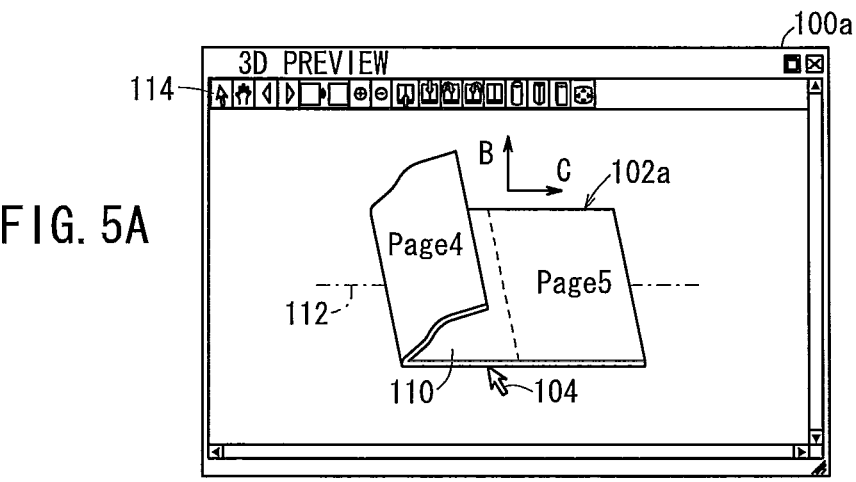
FIGS. 5A through 5C are schematic views showing a second change in the 3D preview screen of the virtual print.

Then, as shown in FIG. 5A, when the approver slides the mouse 34 along the direction indicated by the arrow B while the pointer 104 is pointing to a certain location (e.g., a lower end 110) on the virtual print 102*a* displayed by the preview screen 100*a*, the virtual print 102*a* changes in shape with the lower end 110 following the pointer 104. Specifically, as shown in FIG. 5B, the virtual print 102*a* changes to a displayed state in which the virtual print 102*a* is turned in its entirety by 90 degrees about a central line 112, so that a new virtual print 102*b* is displayed on a preview screen 100*b*.

Figure 5B:
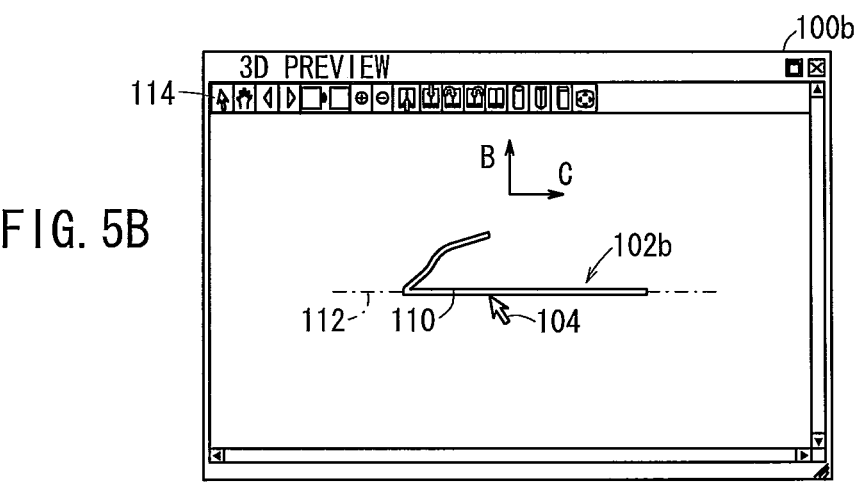
Figure 5C:
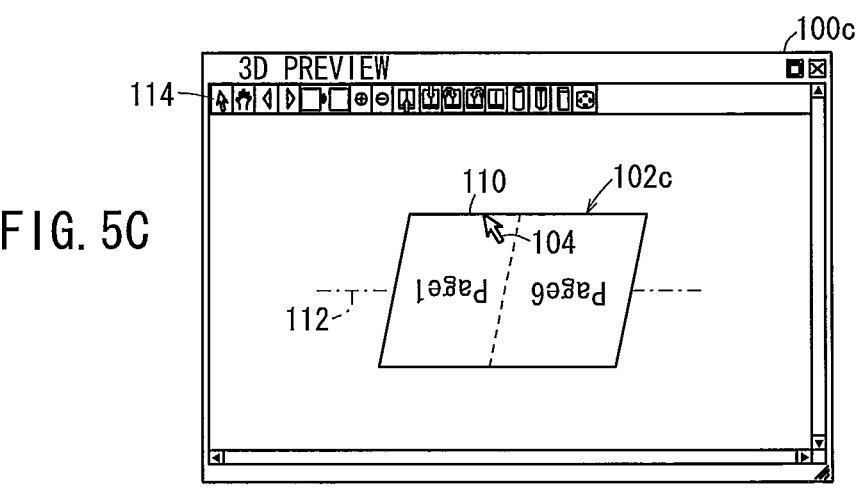

Then, when the approver slides the mouse 34 along the direction indicated by the arrow C from the state shown in FIG. 5B, the virtual print 102*b* changes to a displayed state in which the virtual print 102*b* (102*a*) is turned in its entirety by 90 degrees (180 degrees) about the central line 112 crossing the short sides, so that a new virtual print 102*c* is displayed on a preview screen 100*c*, as shown in FIG. 5C.

Similarly, when the approver slides the mouse 34 along the direction indicated by the arrow B from the state shown in FIG. 5A, the virtual print 102*a* is turned in its entirety about an axis parallel to the direction indicated by the arrow B. Specifically, when the approver slides the mouse 34 obliquely, amounts of angular movement along the respective directions indicated by the arrows B, C are calculated, and the virtual print 102*a* is turned in its entirety by the sum of the calculated amounts.

The preview screen 100 includes an icon group 114 disposed in its upper region. The displayed state of the virtual print 102 can immediately be changed in response to an action on the icon group 114. Items which determine the displayed state include, for example, observational modes such as a display magnification, a position, an attitude, etc., and physical properties such as sheet thickness (flexibility), page surface gloss, etc.

Displayed contents of the virtual print 102 can immediately be selected in response to an action on the icon group 114. The displayed contents include selecting continuous tone display or separate color plate display, selecting the display or non-display of a bleed area, selecting a range of pages that can be browsed, etc.

In this manner, the approver can confirm print contents in a state close to the final form of a print that is to be actually produced.

Figure 3:
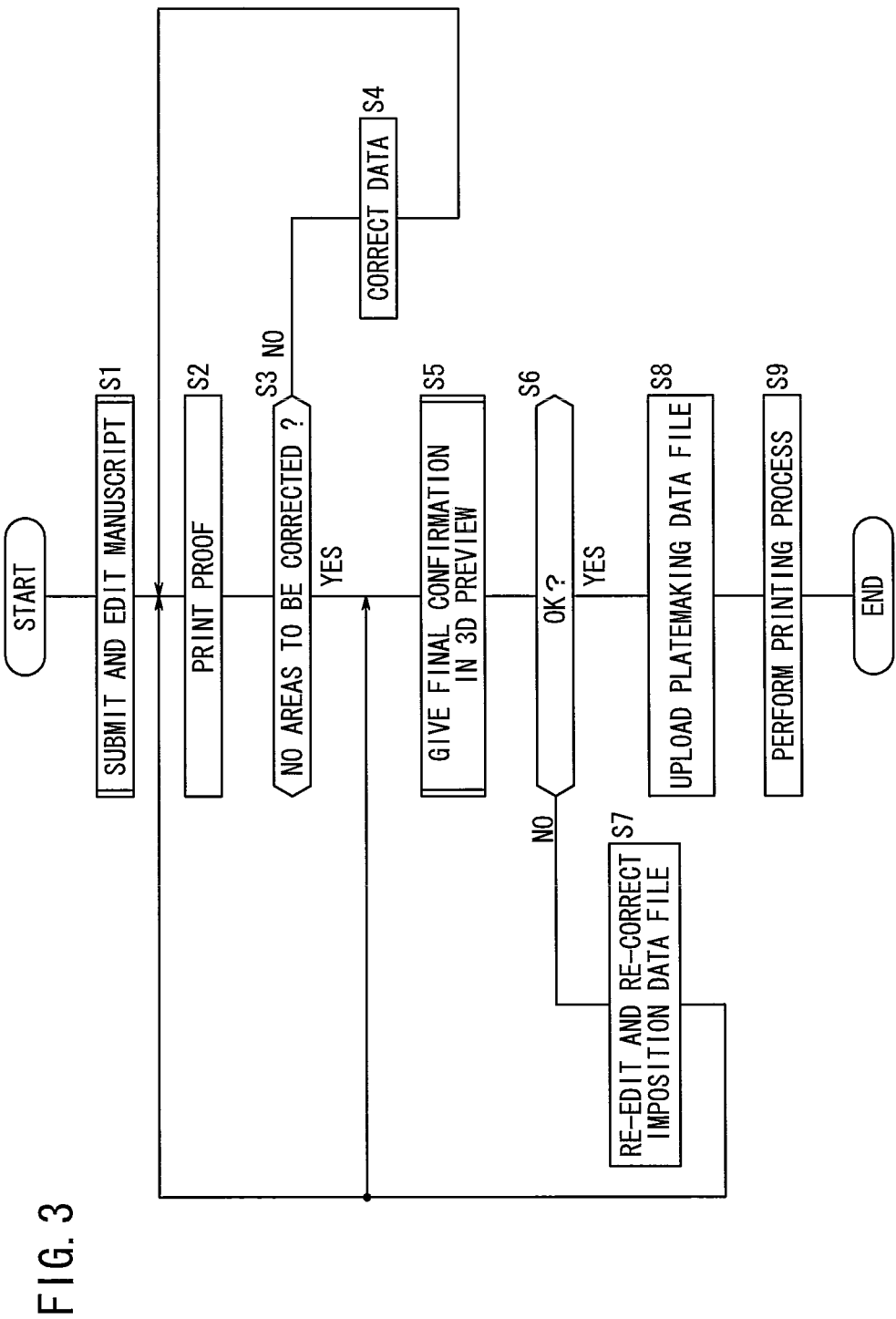
FIG. 3 is a flowchart of a printing work flow carried out by the printing system shown in FIG. 1.

In FIG. 3, if the approver judges in step S6 that the proof print is not OK as a result of the final confirmation in step S5, then the approver re-edits or re-corrects the imposition data file (step S7). If the change in the re-edited or re-corrected imposition data file is small, then the approver gives a reconfirmation (step S5) or produces a proof print when necessary (steps S2 through S4). In this manner, steps S2 through S7 are repeated until the approver approves of going to a printing process.

If the approver judges in step S6 that the proof print is OK as a result of the final confirmation in step S5, then the operator uploads a data file to the database server 16 (step S8). The controller 42 sends the latest imposition data file stored in the memory 52 as a platemaking data file to the database server 16 via the I/F 30 and the LAN 18.

Finally, the operator performs a printing process (step S9). Specifically, the printing site 14 downloads the platemaking data file stored in the database server 16. Thereafter, the image processing device performs a desired image processing on the platemaking data file, and the platesetter creates printing plates based on the processed platemaking data file. The offset press then prints a color image using the printing plates. Alternately, printing plates may not be created, and a digital printing press may print a color image directly based on the platemaking data file.

The full sequence from the submission of manuscript data to the printing of a color image is now finished.

Operation of the image editing apparatus 20 in the submission and editing of manuscript data step (step S1) shown in FIG. 3 will be described in detail below with reference to FIG. 6.

First, each data file is entered (step S11).

As shown in FIG. 2, according to an instruction to submit a manuscript from the client, the non-illustrated terminal device supplies a desired submitted manuscript data file to the image editing apparatus 20 via the LAN 18. The image editing apparatus 20 stores the submitted manuscript data file supplied via the I/F 36 in the memory 52.

The submitted manuscript data file may be of any desired file format. For example, it may be in the format of any of various application data including PDF, PS, EPS (Encapsulated PS: registered trademark), TIFF, InDesign (registered trademark) of AdobeSystems. The submitted manuscript data file of any of various file formats may be converted into a PDL file for editing purposes.

Then, the operator selects an imposition pattern (step S12). The operator can select a desired one of various imposition patterns from a selection screen 120 shown in FIGS. 7 through 10.

Figure 7:
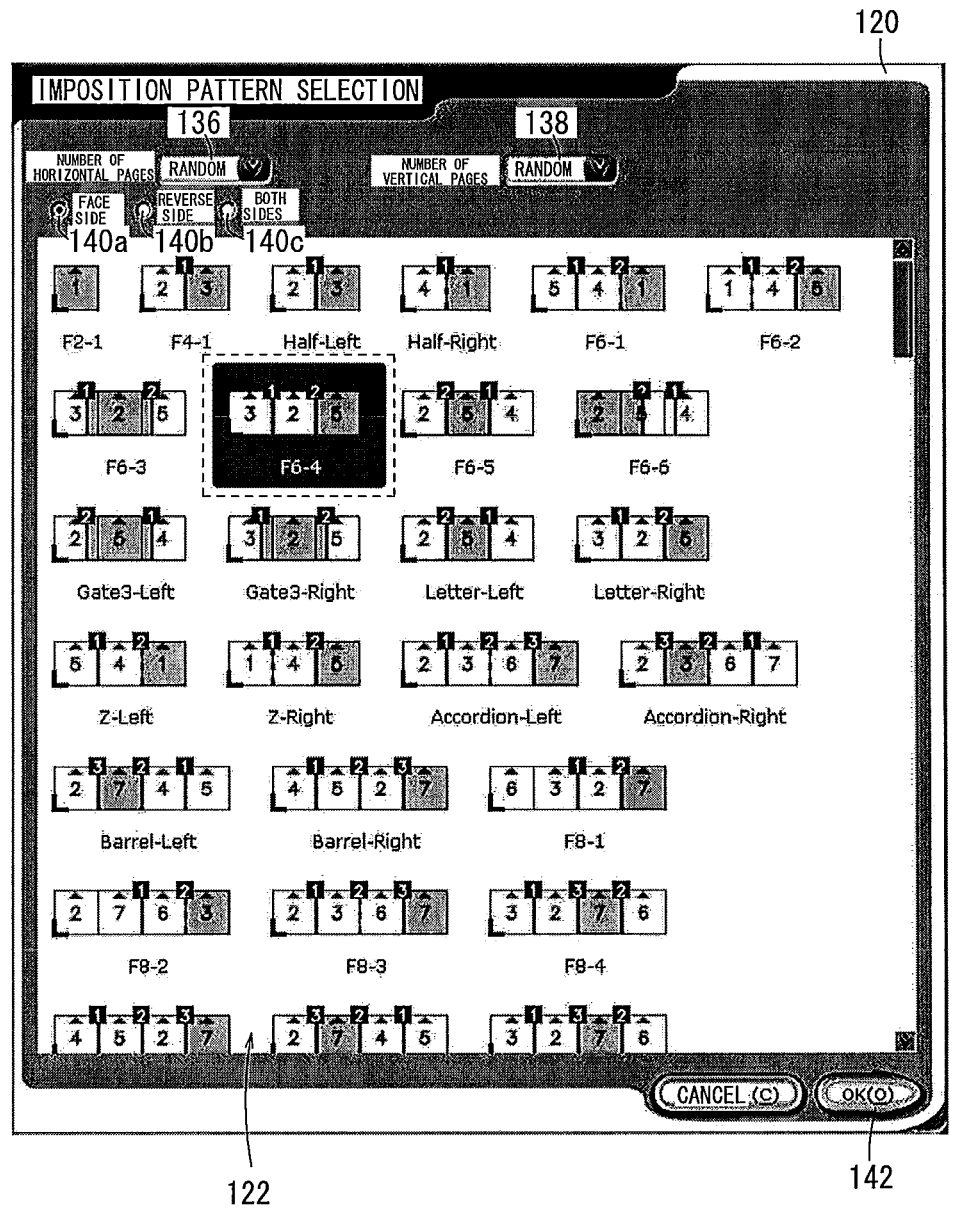
FIG. 7 is a first view showing a screen for selecting an imposition pattern.

As shown in FIG. 7, the selection screen 120 has a display field 122 substantially fully thereover, displaying various imposition patterns thereon.

Figure 8:
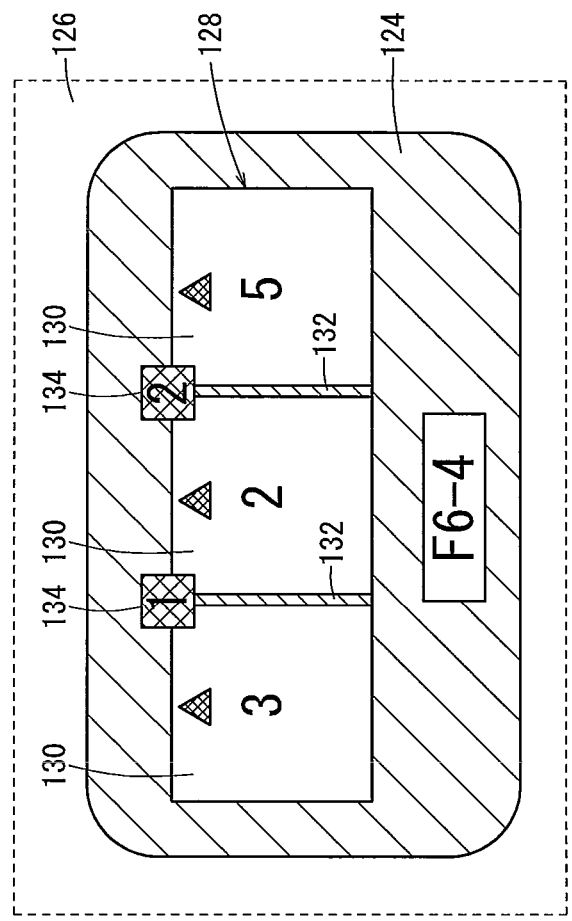
FIG. 8 is an enlarged partial view of a display field shown in FIG. 7.
Figure 9:
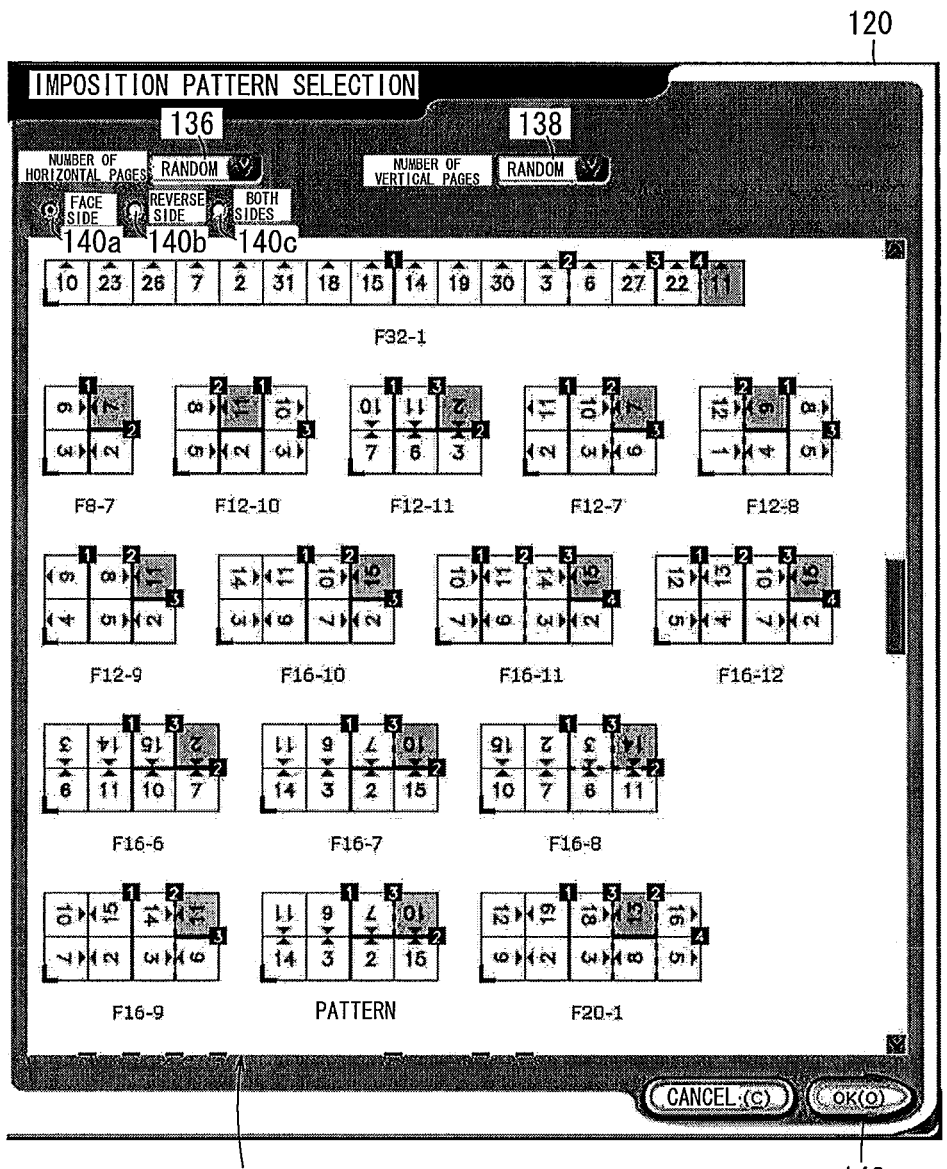
FIG. 9 is a second view showing the screen for selecting an imposition pattern.
Figure 10:
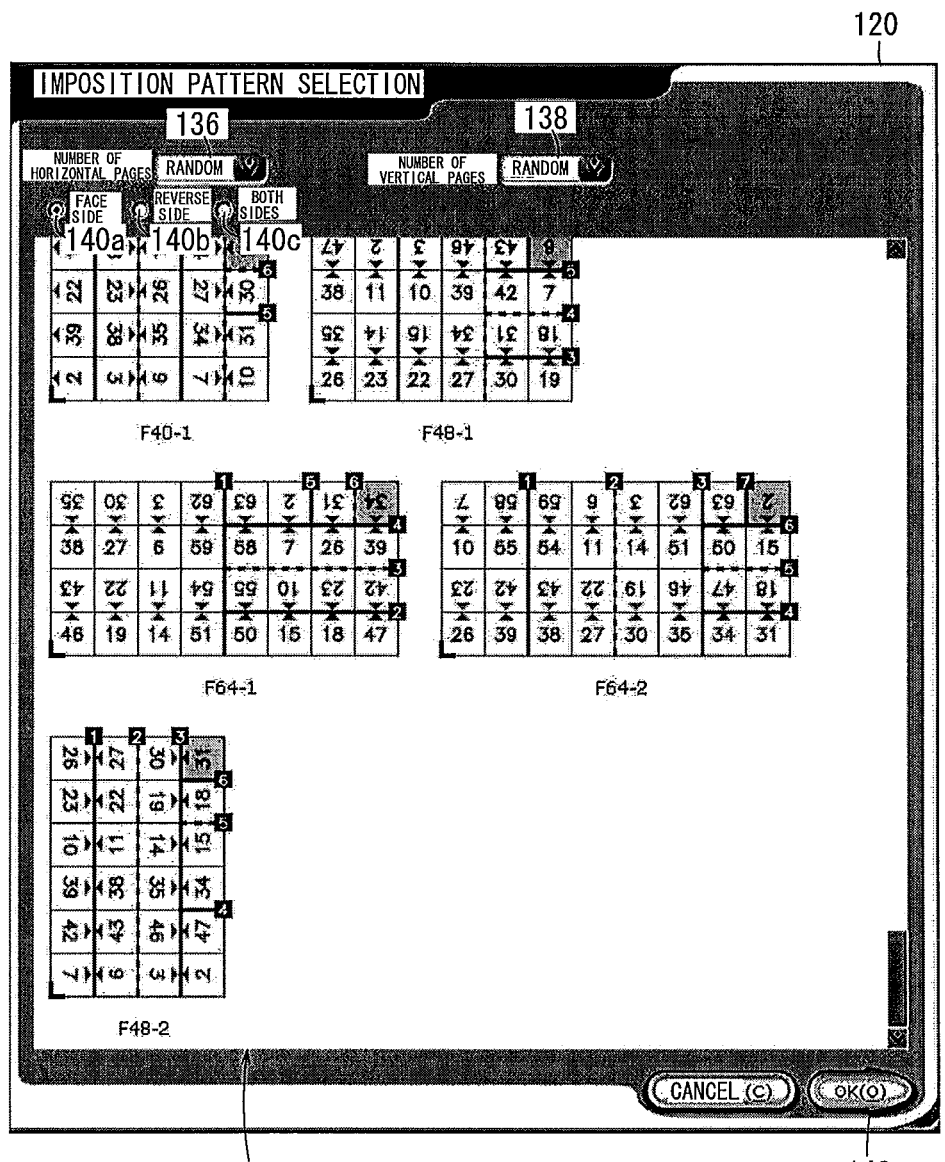
FIG. 10 is a third view showing the screen for selecting an imposition pattern.

FIG. 8 is an enlarged partial view of the display field 122 (a rectangular area surrounded by the broken lines) shown in FIG. 7. An area 124 shown hatched is displayed in a color different from the colors of a background 126 and a pattern 128. The pattern 128, which is referred to as an imposition name "F6-4", is surrounded by the area 124, indicating that the pattern 128 is currently selected.

The pattern 128 is made up of rectangular areas 130 each corresponding to a page. The numerals shown substantially centrally in the rectangular areas 130 represent respective page numbers. Two vertical thick lines 132 displayed on the pattern 128 represent fold lines. Fold lines indicated by the solid lines represent peak folds, and fold lines indicated by the broken lines represent valley folds. Numerals 134 displayed near the thick lines 132 represent the order of page folding.

As shown in FIG. 7, the selection screen 120 has various assistive functions to assist the operator in selecting imposition patterns for the convenience of the operator.

The assistive functions include pull-down menus 136, 138 for selectively showing imposition patterns having horizontal and vertical page number settings, respectively. When the operator selects a horizontal page number setting in the pull-down menu 136 or a vertical page number setting in the pull-down menu 138, the display field 122 shows only imposition patterns for a horizontal page number which is of the selected horizontal page number setting or a vertical page number which is of the selected vertical page number setting. In this manner, the number of patterns displayed in the display field 122 can be reduced.

The assistive functions also include radio buttons 140a through 140c. The operator can change imposition pattern display modes in the display field 122 by selecting the radio buttons 140a through 140c. For example, when the operator selects the radio button 140a, the display field 122 displays only the face side of each imposition pattern. When the operator selects the radio button 140b, the display field 122 displays only the reverse side of each imposition pattern. When the operator selects the radio button 140c, the display field 122 displays the face and reverse sides of each imposition pattern as a pair. The operator can thus select the radio buttons 140a through 140c while confirming the imposition patterns as they are finished.

When the operator clicks on an OK button 142, the imposition information input unit 78 inputs the type of a selected imposition pattern to the main unit 26. Thereafter, the memory 52 stores the type of the imposition pattern acquired from the imposition information input unit 78. The memory 52 stores in advance various presentation information representing a horizontal page number, a vertical page number, page numbers, etc. depending on each imposition pattern.

The operator may design a page folding process (a fold line position and a page folding direction), a binding process, etc. and may save the designed processes as a unique imposition pattern. At this time, the main unit 26 may calculate an association between the saved imposition pattern and page numbers, and may store page association information thus obtained in the memory 52.

Then, the image editing apparatus 20 arranges pages of edited data depending on the imposition pattern (step S13).

Figure 11:
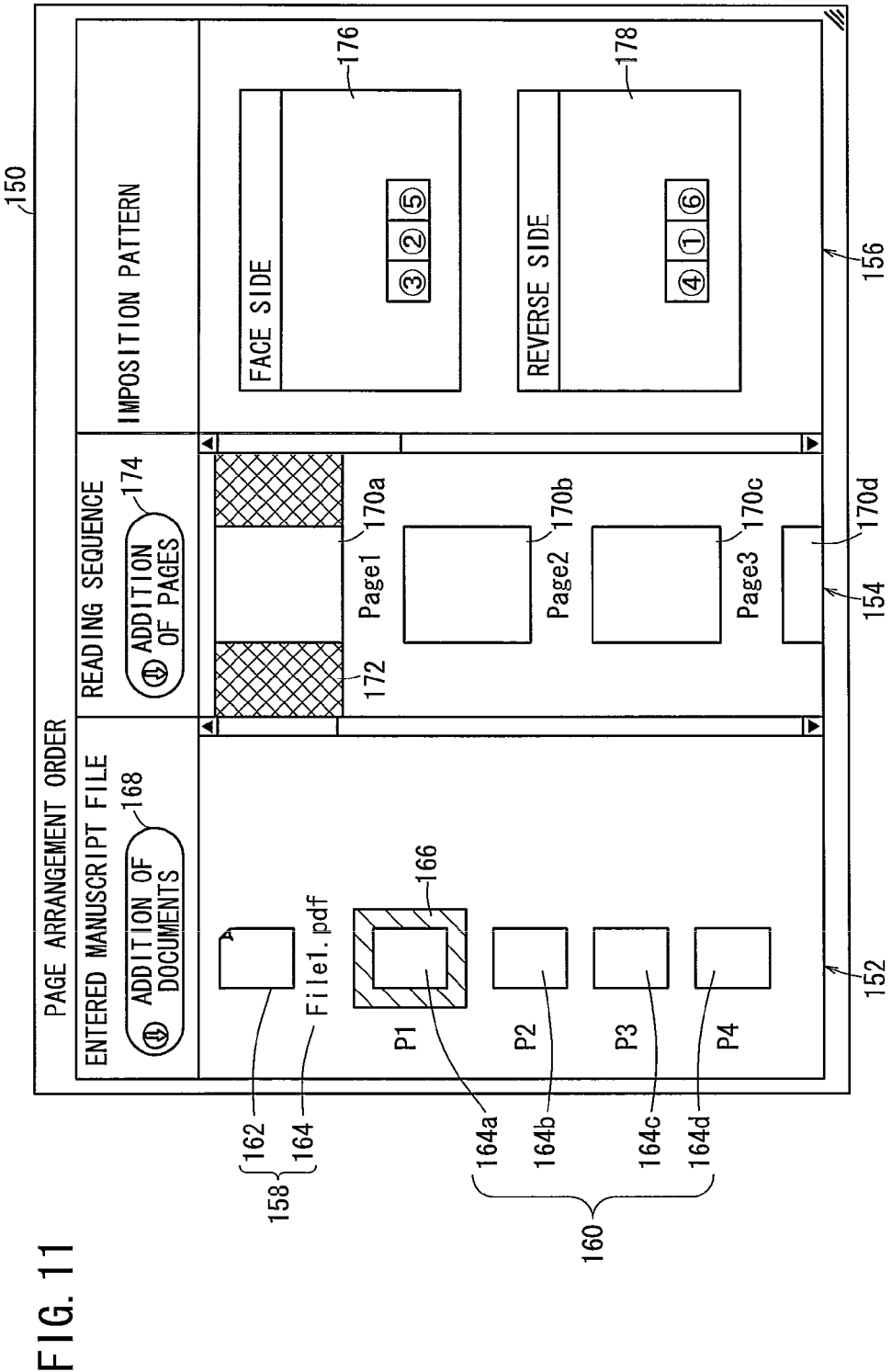
FIG. 11 is a view showing an arrangement screen for setting a page arrangement order.

As shown in FIG. 11, an arrangement screen 150 is divided into three display fields including a left first display field 152, a central second display field 154, and a right third display field 156.

The first display field 152 displays attribute information 158 of an entered data file and a plurality of thumbnails 160 which are shown successively from above. The attribute information 158 includes an icon 162 representative of a file format and a file name 164 including an extension. In FIG. 11, the displayed thumbnails 160 include thumbnails 164a through 164d of first through fourth pages of data "File1.pdf". The thumbnail 164a is surrounded by a hatched area 166, showing that the thumbnail 164a is currently selected. A new data file to be input can be added when the operator clicks on a button 168.

The second display field 154 includes a plurality of image display fields 170a through 170d which are shown successively from above. The image display fields 170a through 170d show images of the first through fourth pages, respectively. A new page to be imposed can be added when the operator clicks on a button 174.

The image display fields 170a through 170d initially display blank images. When the operator operates the mouse 34 to drag and drop the thumbnail 164a to the image display field 170a, for example, the first page of the imposition data and the first page of the data "File1.pdf" are associated with each other. At this time, the image displayed in the image display field 170a changes from the blank image to the thumbnail 164a. Similarly, subsequent pages of the imposition data and desired data files (pages) are associated with each other.

The third display field 156 displays the imposition pattern 128 selected in FIGS. 7 and 8. The third display field 156 includes a small field 176 which displays a page arrangement and page numbers on the face side of the imposition pattern and a small field 178 which displays a page arrangement and page numbers on the reverse side of the imposition pattern. The operator can thus perform an imposition process while confirming the type of the imposition pattern.

In response to an action on the mouse 34, the imposition information input unit 78 inputs the page association information to the main unit 26. The memory 52 stores the input page association information.

Figure 6:
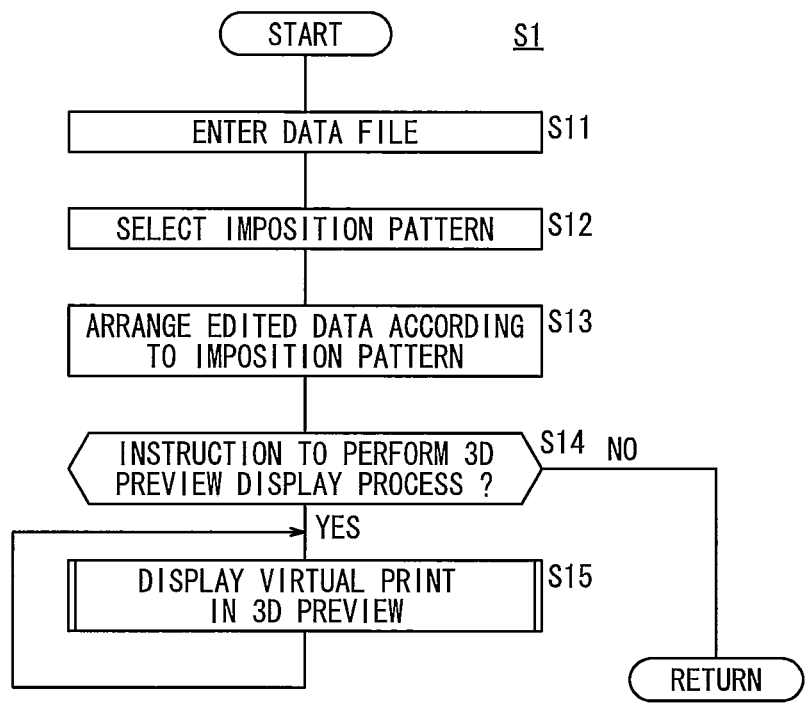
FIG. 6 is a flowchart of an operation sequence of the image editing apparatus in a manuscript submission and editing step shown in FIG. 3.

Then, as shown in FIG. 6, the image editing apparatus 20 determines whether there is an instruction for displaying the virtual print 102 in a 3D preview or not (step S14). If there is not an instruction for displaying the virtual print 102 in a 3D preview, then the operation sequence in step S1 (FIG. 3) is ended. If there is an instruction for displaying the virtual print 102 in a 3D preview, then the image editing apparatus 20 performs a 3D preview display process (step S15).

Operation of the image editing apparatus 20 in step S15 will be described in detail with reference to FIG. 12.

First, the image editing apparatus 20 performs an RIP process on imposition data (step S151).

Prior to the generation of imposition data, the imposition information acquirer 56 shown in FIG. 2 acquires imposition information from the memory 52. Specifically, the presentation information acquirer 72 acquires print presentation information from the memory 52, and the image layout information acquirer 74 acquires image layout information from the memory 52.

The imposition processor 58 acquires pages of edited data from the memory 52, acquires the print presentation information and the image layout information from the imposition information acquirer 56, and generates imposition data from the acquired set of data.

Figure 13:
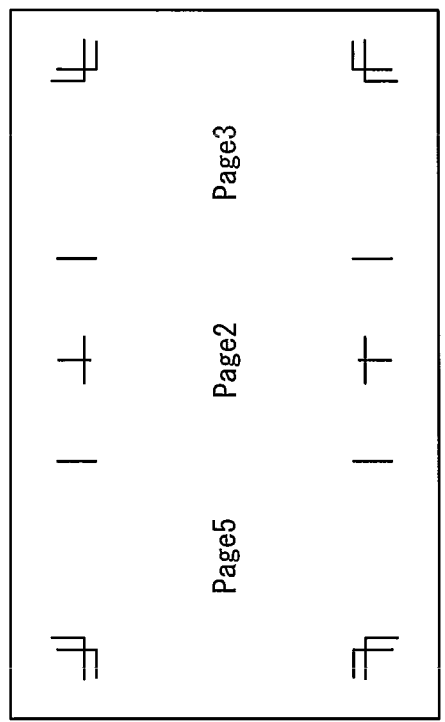
FIG. 13 is a schematic view showing an imaging example of raster-format imposition data.

The RIP processor 60 performs an RIP process on the imposition data acquired from the imposition processor 58 to generate RIP-processed imposition data. Specifically, the RIP processor 60 performs the following image processing process:

The RIP processor 60 determines an image area of a first page within image data (intermediate data) by referring to the image layout information. Then, the RIP processor 60 acquires a page of edited data associated with the first page by referring to the page association information. The RIP processor 60 embeds the edited data in the image area of the first page within the image data. Subsequently, the RIP processor 60 similarly arranges all the pages. The RIP processor 60 then adds register marks (central and corner register marks) to the image data at given positions therein, thereby producing image data as shown in FIG. 13.

Finally, the RIP processor 60 rasterizes the produced image data into RIP-processed imposition data. The RIP-processed imposition data may be multigradation image data such as bitmap data or screened binary image data. If the image data are converted into image data for four color plates (separations) in C, M, Y, K, then the RIP processor 60 rasterizes the image data into RIP-processed imposition data for the respective color plates.

Figure 12:
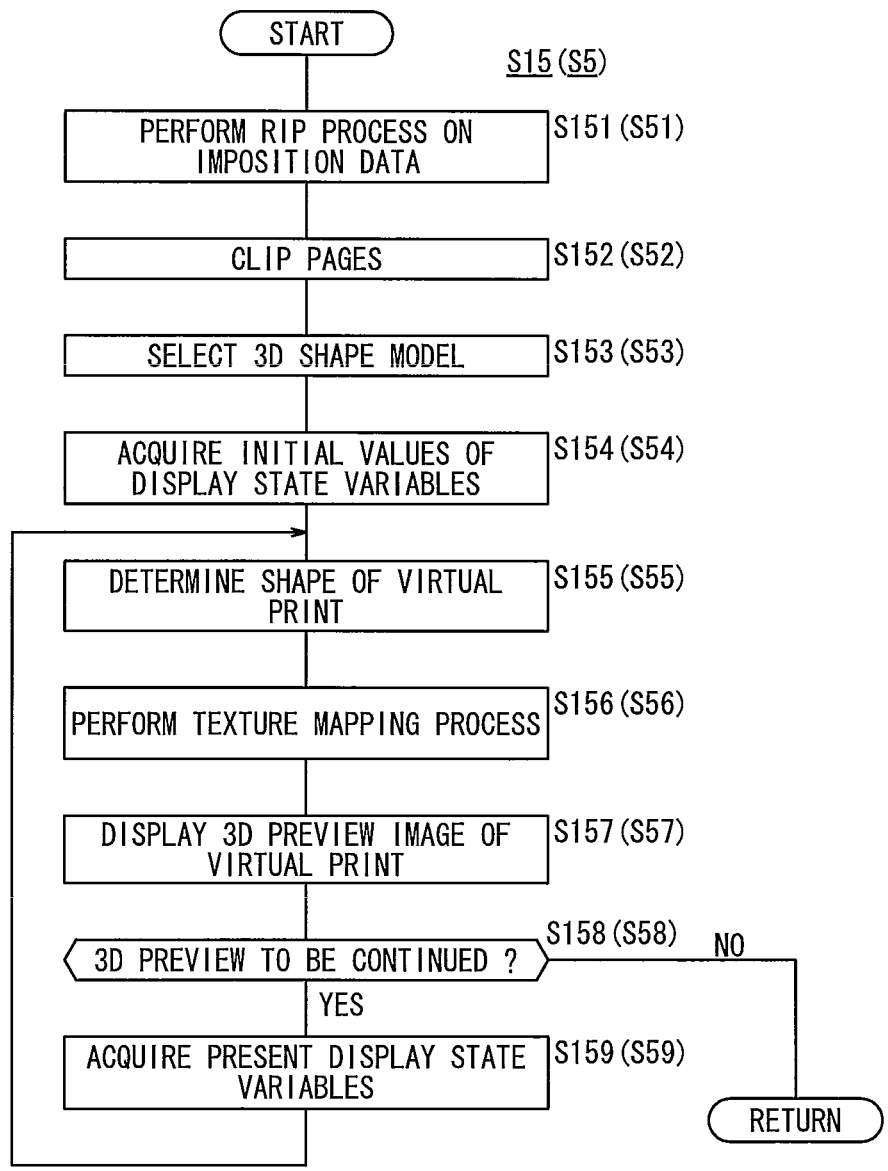
FIG. 12 is a flowchart of an operation sequence of the image editing apparatus in a 3D preview display step shown in FIG. 6.
Figure 14:
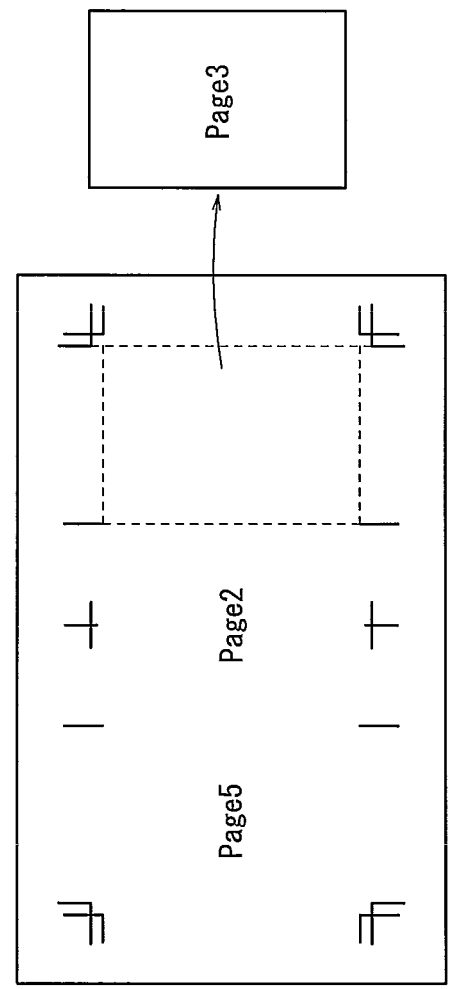
FIG. 14 is a schematic view showing an imaging state in which page data are clipped from the raster-format imposition data.

Then, the page clipping processor 62 clips page data from the RIP-processed imposition data (step S152 in FIG. 12). Specifically, the page clipping processor 62 clips page data for respective page areas from the RIP-processed imposition data obtained from the RIP processor 60. The page clipping processor 62 electronically clips page data along lines in alignment with the register marks, as is the case with cutting pages in a bookbinding process. FIG. 14 shows, for example, a third page of page data clipped from a face side of an imposition pattern "gate fold".

The operator may be allowed to select whether a bleed area is to be displayed or not in a 3D preview image. Depending on the operation by the operator, the display selector 82 inputs, in advance, selection information about whether to display a bleed area or not to the main unit 26. Based on the operator's selection, the page clipping processor 62 clips each page of page data including or excluding a bleed area. In this manner, the operator can confirm each displayed page of page data depending on its own preference. The bleed area may include, for example, trim (finish), bleed margin (cropping margin), and creep (space required the thickness and folding of sheets for saddle stitch binding).

The page clipping processor 62 may clip each page including a bleed area regardless of whether to display a bleed area or not. At this time, each page of page data may be presented, i.e., 3D preview data may be generated, including or excluding a bleed area depending on the operator's selection. In this manner, it is not necessary to newly clip each page of page data each time the operator changes settings for selecting whether to display a bleed area or not.

If the size of PDL data that are submitted is large, e.g., if the size of PDL data that are submitted is large enough to cover fifth, second, and third pages on the face side of the imposition data shown in FIG. 13, the page clipping processor 62 may divide the PDL data into a plurality of pages according to the imposition information and clips the pages.

Figure 15:
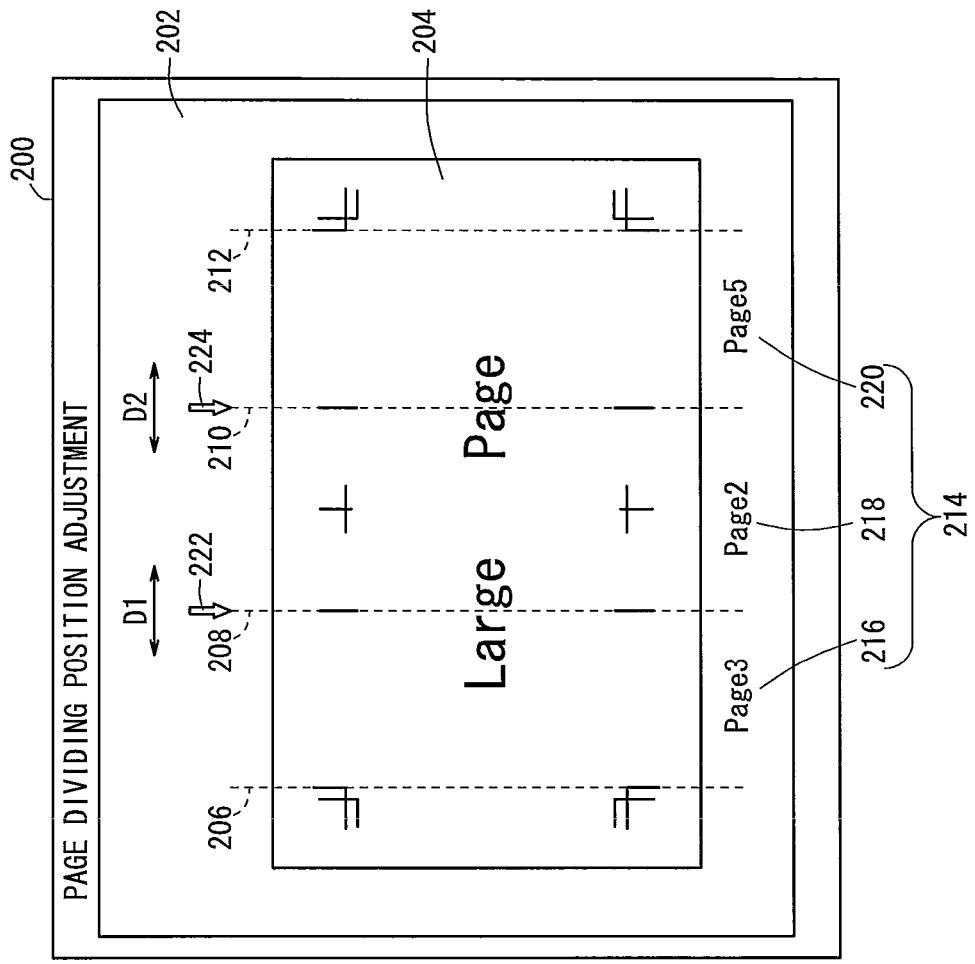
FIG. 15 is a view showing a setting screen for setting page divisions.

FIG. 15 is a view showing a setting screen 200 for setting PDL data divisions. The setting screen 200 includes a display field 202 which displays a visible image 204, denoted as "Large Page", represented by PDL data. The visible image 204 is divided into an array of sections by a left end line 206, a boundary line 208, a boundary line 210, and a right end line 212, which are indicated by broken lines. The setting screen 200 also includes a character string 214 representing page numbers below the visible image 204. The character string 214 includes a character string 216 displayed between the left end line 206 and the boundary line 208 as representing "Page 3", a character string 218 displayed between the boundary line 208 and the boundary line 210 as representing "Page 2", and a character string 220 displayed between the boundary line 210 and the right end line 212 as representing "Page 5".

Prior to the display of the setting screen 200, the dividing position calculator 71 acquires PDL data to be divided and then detects the positions of register marks in the data area. The dividing position calculator 71 may use a known algorithm such as template matching or the like to detect the positions of register marks. The dividing position calculator 71 then determines the number and positions of the left end line 206, the boundary line 208, the boundary line 210, and the right end line 212 based on the detected positions of the register marks. Alternatively, the dividing position calculator 71 may detect trim areas (the left end line 206 and the right end line 212) of the PDL data, and calculate the positions of the boundary lines 208, 210 to equally divide the trim areas based on the number of pages (three pages in FIG. 8) per imposition pattern acquired from the imposition information acquirer 56.

The display controller 44 displays the boundary lines 208, 210, etc. depending on the number of lines and positions of lines acquired from the dividing position calculator 71, in superposed relation to the visible image 204 in the display field 202. The operator can now grasp at a glance the positions where the PDL data are divided into pages.

The operator may change the initial value of the dividing position for each page, using the input unit 30. Based on an action made by the operator on the mouse 34, the boundary line 208 can be moved in position along the directions indicated by the arrow D1, and the boundary line 210 can be moved in position along the directions indicated by the arrow D2. The imposition information input unit 78 stores adjusted values input to the main unit 26 in the memory 52. When necessary, the imposition information acquirer 56 may acquire the adjusted values from the memory 52. The operator can thus easily finely adjust the positions at which the PDL data are to be divided into pages.

When the presently set positions of the boundary lines 208, 210 for dividing the PDL data are fixedly displayed at respective arrows 222, 224, the operator can work on the PDL data while referring to the present settings.

Then, a 3D shape mode is determined (step S153).

Figure 16:
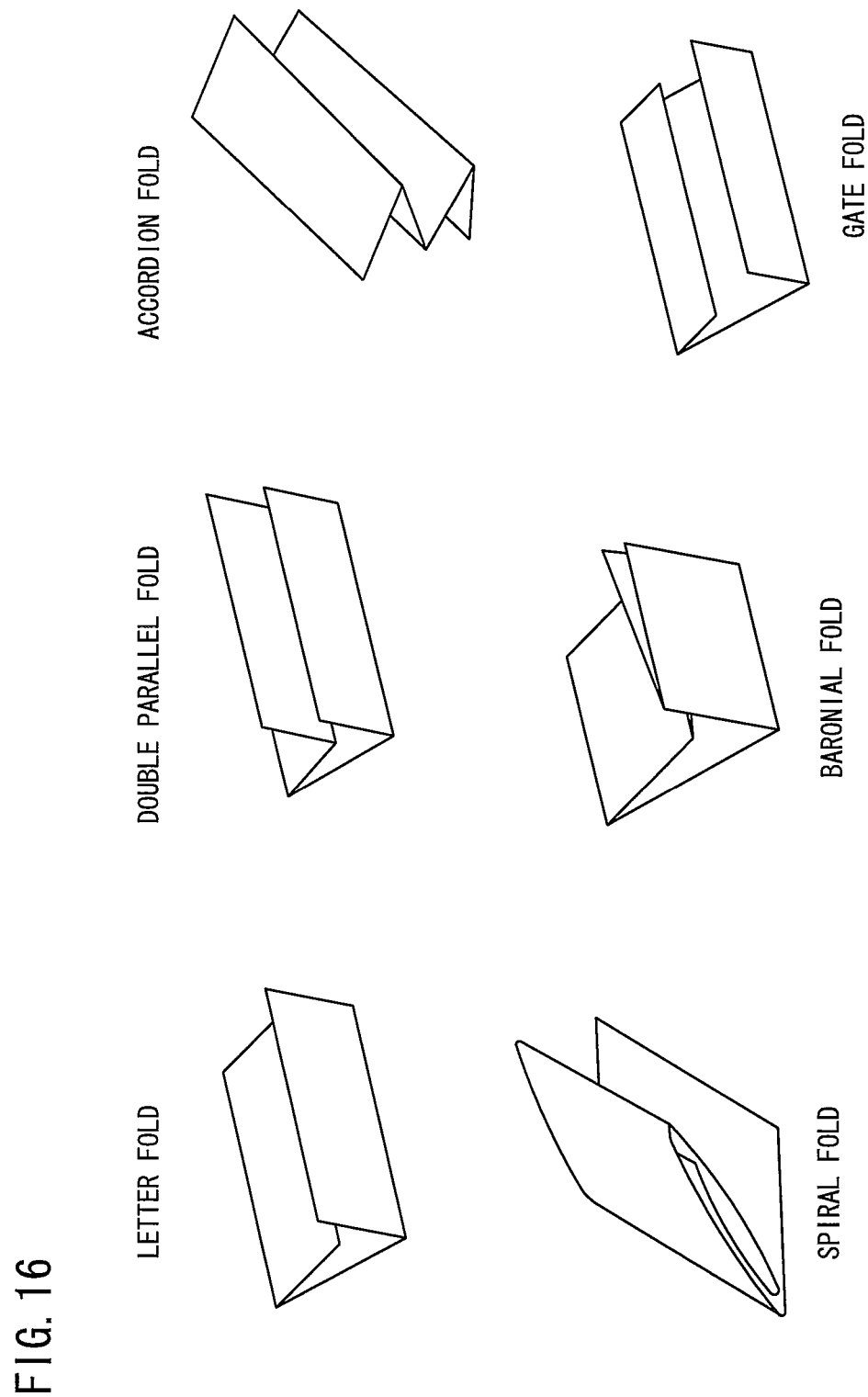
FIG. 16 is a schematic perspective view of 3D shape models of jobs.

FIG. 16 is a schematic perspective view of 3D shape models of jobs. FIG. 16 shows six examples of paper fold including letter fold, double parallel fold, accordion fold, spiral fold, baronial fold (folding in half and then perpendicularly in three), and gate fold. The 3D shape models also include various states including an open state, a folded state, and an intermediate state of those folds.

Usually, a 3D shape model which is identical to the 3D shape model selected in step S2 (see FIG. 3) is automatically or manually determined in order to match a print that is to be actually produced. The 3D shape models may be changed to various models depending on the preference of the observer. For example, a pattern which is different from the pattern selected in step S12 (see FIG. 6) may be selected in order to preview various imposition patterns.

If the operator uniquely designs a page folding process and a binding process, then the shape model determiner 66 may construct a 3D shape model based on the newly generated imposition pattern.

Then, as shown in FIG. 12, the display state variable acquirer 64 acquires the initial values of display state variables. Specifically, the display state variable acquirer 64 acquires, as the initial values, observational modes such as a display magnification, a position, an attitude, etc., and physical properties such as sheet thickness, page surface gloss, etc. of the virtual print 102.

Then, the 3D data generator 70 determines a shape of the virtual print 102 (step S155). Specifically, the 3D data generator 70 determines a present shape (framework) of the virtual print 102 based on the 3D shape model acquired from the shape model determiner 66 and the observational modes (particularly, the attitude) and the physical properties (particularly, the sheet thickness) acquired from the display state variable acquirer 64. For example, the 3D data generator 70 determines plot data depending on the present attitude, among a plurality of sets of plot data.

Figure 17:
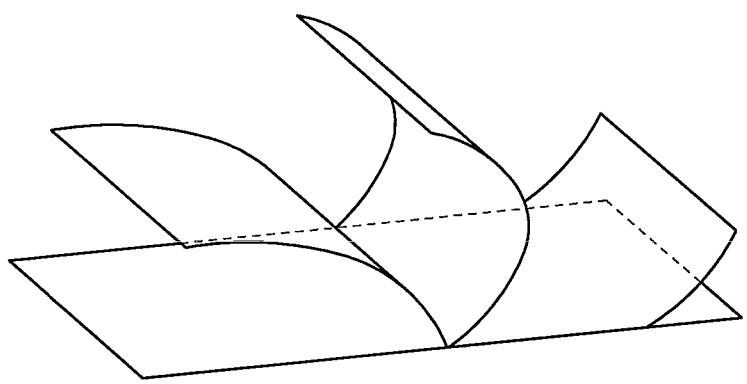
FIG. 17 is a schematic perspective view of a 3D shape model of a book.

For example, a 3D shape shown in FIG. 17 is obtained based on the 3D shape model of a given book. Since the flexibility of the base material (paper) is reproduced and visualized, the operator can easily imagine the final form of the print.

Then, a texture mapping process is carried out (step S156).

Prior to image processing, the data selector 68 acquires a plurality of page data corresponding to respective pages from the page clipping processor 62. Then, the data selector 68 selects at least one of the acquired page data by referring to the display state variables (page numbers that are being displayed) acquired from the acquirer 64.

The 3D data generator 70 adjusts, if necessary, the 3D shape model acquired from the shape model determiner 66. For example, the 3D data generator 70 finely adjusts the size so that the 3D shape model can be rendered in a given image area (a prescribed number of pixels) while referring to the imposition information acquired from the imposition information acquirer 56.

For example, if the imposition pattern is "F6-4" (see FIGS. 7 and 8), then the thick lines 132 are disposed respectively between the second page and the third page and between the second page and the fifth page on the face side. On the pattern 128 which is displayed, these pages are of the same size. Actually, the sizes of the pages can freely be selected depending on the imposition information. Based on the sizes (horizontal and vertical dimensions) of the pages, the overall size of the 3D shape model is estimated and rescaled. In this case, it is preferable to keep the virtual print 102 within a predetermined image area up to the maximum dimensions of the 3D shape model even if the position and attitude of the virtual print 102 are random. In this manner, the operator can browse the virtual print 102 at as large a size as possible.

The 3D data generator 70 maps page data acquired from the data selector 68 onto the shape of the virtual print 102 determined in step S155, thereby generating 3D preview data. Specifically, the 3D data generator 70 extracts an image area of pages to be displayed and performs a mapping process to match the shape of the extracted image area thereby to apply the page data to the image area. The mapping process may be based on any of various known algorithms. If necessary, the memory 52 temporarily stores the 3D preview data generated by the 3D data generator 70.

If the operator is to see a 3D preview of a book of several hundred pages, then since the total amount of page data required is vast, they may possibly adversely affect the processing rate. To avoid this difficulty, the page selector 63 may preselect page data to be clipped for thereby reducing the number of pages (some of all the pages) to be used for the 3D preview. Pages may be preselected by specifying two of a start page, an end page, and the number of pages, for example. If a book is to be bound of a plurality of signatures, then pages may be preselected from overall pages, pages on signatures, or signatures. Any of these selecting processes may be freely changed by the operator.

For example, if a book has a total number of 256 pages (four signatures of 64 pages), then all pages may be selected or 100 pages such as 1st through 100th pages, 101st through 200th pages, or the like may be selected. Alternatively, the first signature (1st through 64 pages), first and last three pages of the second signature (65th through 67th pages, 126th through 128th pages), or the like may be selected. Further alternatively, only right or left pages of two-page spreads may be selected. The page selector 63 may select pages whose actual page data are to be displayed or pages whose actual page data are not to be displayed.

The 3D page generator 70 may generate 3D preview data as blank data for remaining pages that are not selected by the page selector 63. In order for the operator not to misidentify blank data as missing pages, the 3D page generator 70 may apply marks for the operator to recognize that the present page data are not displayed.

Bookbinding processes are not limited to side stitching, but may include perfect binding, saddle stitching, double-leaved centerfold, and thread stitching.

Either one of the gradation rendering processes including continuous tone display or separate color plate display may be selected, and a 3D preview image may be displayed according to the selected gradation rendering process. At this time, in response to an action made on the input unit 30 by the operator, the display selector 82 inputs, in advance, information about which of the continuous tone display or the separate color plate display is selected to the main unit 26. In response to an action made on the input unit 30 by the operator, the display selector 82 inputs, in advance, information about at least one of C, M, Y, K plates and special color plates to the main unit 26. Special colors refer to colors (excluding C, M, Y, K) for increasing the color reproduction on printed images, and may include R, G, B, pink, orange, flesh color, gold, and silver. These special colors belong to an assistive simple-color group for producing colors that cannot be reproduced using C, M, Y, K. The 3D data generator 70 performs a color conversion process suitable for the continuous tone display or the separate color plate display, depending on the selected color plate.

If the continuous tone display is selected, then the 3D data generator 70 descreens the 3D preview data separated into the colors thereby to convert the 3D preview data into 3D preview data as multigradation data (e.g., 8-bit R, G, B data). If the separate color plate display is selected, particularly a plurality of color plates (e.g., a C plate and an M plate), then the 3D data generator 70 generates 3D preview data where the color plates are superposed. In this manner, it is possible to confirm whether there is a Moiré pattern due to the screening process or not.

Then, the 3D preview image of the virtual print 102 is displayed (step S157).

The display controller 44 places the 3D preview data acquired from the memory 52 in a given position on the preview screen 100 (see FIG. 4A, etc.). Then, the display controller 44 outputs a display control signal to the display unit 28 via the I/F 46 to display the preview screen 100 shown in FIG. 4A on the display unit 28. Since the display state variables are of initial values at this time, the initial state of the virtual print 102 is displayed. The virtual print 102 shown in FIG. 4A is free of folds and has its face side facing upwardly.

Then, it is determined whether the 3D preview is to be continued or not (step S158). If the 3D preview is to be continued, then new display state variables of the virtual print 102 are acquired (step S159). When the values of the display state variables are updated in response to a certain action on the mouse 34, the display state variable input unit 80 inputs the updated display state variables to the main unit 26. The display state variable acquirer 64 acquires the values of the display state variables.

Then, control goes back to step S155, and the image editing apparatus 20 repeats steps S155 through S159. Each time the display state variables are changed, the display data generator 54 performs a rendering process, so that a new form of the virtual print 102 can immediately be displayed on the display unit 28. Specifically, in response to an action on the mouse 34, the virtual print 102 can have its paged turned, or can be rotated or reversed (see FIGS. 4A through 5C).

The 3D preview (step S5 in FIG. 3) can be performed in the same manner as describe above according to steps S51 through S59 of the flowchart shown in FIG. 12.

As described above, page data of a plurality of page areas are clipped from raster-format data, and the clipped page data are mapped onto respective model areas corresponding to the page areas on the three-dimensional shape model of a print, thereby generating three-dimensional preview data of the print. Accordingly, it is possible to generate and display a preview image under conditions close to block copy data and print presentation forms with which to actually produce the print, so that the print presentation forms of the print can be predicted accurately. The efficiency of the proofreading process is thus greatly increased.

The proofreading process may be carried out while referring to a 3D preview image (the virtual print 102 shown in FIG. 4A) rather than the proof press 22. In other words, when the 3D preview display (step S15 in FIG. 6) is necessarily carried out, the printing of a proof (step S2 shown in FIG. 3) is not required.

Although a certain preferred embodiment of the present invention has been shown and described in detail, it should be understood that various changes and modifications may be made therein without departing from the scope of the appended claims.

What is claimed is:

1. An image editing apparatus comprising:
   an imposition information acquirer for acquiring imposition information for a print to be printed based on page description language data;
   an imposition processor for imposing the page description language data to generate imposition data according to the imposition information acquired by the imposition information acquirer;
   a RIP processor for performing a RIP process on the imposition data generated by the imposition processor to convert the imposition data into raster-format data;
   a page clipping processor for clipping page data corresponding respectively to a plurality of page areas from the raster-format data converted by the RIP processor;
   a shape model determiner for determining a three-dimensional shape model for the print;
   a preview data generator for mapping the page data clipped by the page clipping processor onto respective model areas corresponding to the page areas on the three-dimensional shape model determined by the shape model determiner thereby to generate three-dimensional preview data of the print;
   a display unit for displaying a three-dimensional preview image of the print based on the three-dimensional preview data generated by the preview data generator; and
   a page selector for selecting at least one page from pages represented by the imposition data;
   wherein the display unit displays the three-dimensional preview image by displaying an image representing page data of the at least one page selected by the page selector and by not displaying an image representing page data of the remaining pages.

2. The image editing apparatus according to claim 1, wherein the pages represented by the imposition data are provided on a plurality of signatures, and the page selector selects the at least one page from the overall pages, the pages on the signatures, or the signatures.

3. The image editing apparatus according to claim 1, further comprising:
   a bleed selector for selecting whether a bleed area is to be displayed in the three-dimensional preview image or not;
   wherein the display unit displays the three-dimensional preview image by displaying or not displaying the bleed area depending on a selected result from the bleed selector.

4. The image editing apparatus according to claim 3, wherein the page clipping processor clips the page data which include bleed area regardless of the selected result from the bleed selector; and
   the preview data generator generates the three-dimensional preview data which include or do not include the bleed area depending on the selected result from the bleed selector.

5. The image editing apparatus according to claim 1, further comprising:
   a gradation display process selector for selecting one of gradation display processes including continuous tone display or separate color plate display;
   wherein the display unit displays the three-dimensional preview image based on the continuous tone display or the separate color plate display depending on the selected result from the gradation display process selector.

6. The image editing apparatus according to claim 5, wherein the gradation display process selector further selects at least one of a C plate, an M plate, a Y plate, a K plate, and special color plates used for the separate color plate display.

7. The image editing apparatus according to claim 6, wherein the gradation display process selector further selects a plurality of color plates, and the display unit displays the three-dimensional preview image in which the color plates are superposed.

8. The image editing apparatus according to claim 1, wherein the preview data generator adjusts the three-dimensional shape model depending on the imposition information.

9. The image editing apparatus according to claim 8, wherein the preview data generator converts the page data according to a prescribed resolution.

10. The image editing apparatus according to claim 1, wherein the page clipping processor divides page description language data having a large size exceeding a prescribed page area into the page data, and clips the page data.

11. The image editing apparatus according to claim 10, further comprising:
    a dividing position calculator for calculating the number and positions of boundary lines by which the page description language data having the large size are to be divided, based on the imposition information;
    wherein the page clipping processor clips the page data according to the positions of the boundary lines which are calculated by the dividing position calculator.

12. The image editing apparatus according to claim 11, further comprising:
    a dividing position adjuster for adjusting the positions of the boundary lines.

13. An image editing method comprising the steps of:
    acquiring imposition information for a print to be printed based on page description language data;
    imposing the page description language data to generate imposition data according to the acquired imposition information;
    performing a RIP process on the generated imposition data to convert the imposition data into raster-format data;
    clipping page data corresponding respectively to a plurality of page areas from the raster-format data;
    determining a three-dimensional shape model for the print;
    mapping the clipped page data onto respective model areas corresponding to the page areas on the determined three-dimensional shape model thereby to generate three-dimensional preview data of the print;

displaying a three-dimensional preview image of the print based on the generated three-dimensional preview data; and selecting at least one page from pages represented by the imposition data; wherein displaying the three-dimensional preview image by displaying an image representing page data of the at least one page selected and by not displaying an image representing page data of the remaining pages.

14. A non-transitory recording medium storing a program to be executed by a computer, the program enabling the computer to function as:

an imposition information acquirer for acquiring imposition information for a print to be printed based on page description language data;

an imposition processor for imposing the page description language data to generate imposition data according to the imposition information acquired by the imposition information acquirer;

a RIP processor for performing a RIP process on the imposition data generated by the imposition processor to convert the imposition data into raster-format data;

a page clipping processor for clipping page data correspondingly respectively to a plurality of page areas from the raster-format data produced by the RIP processor;

a shape model determiner for determining a three-dimensional shape model for the print;

a preview data generator for mapping the page data clipped by the page clipping processor onto respective model areas corresponding to the page areas on the three-dimensional shape model determined by the shape model determiner thereby to generate three-dimensional preview data of the print; and a page selector for selecting at least one page from pages represented by the imposition data;

wherein a display unit displays the three-dimensional preview image by displaying an image representing page data of the at least one page selected by the page selector and by not displaying an image representing page data of the remaining pages.

* * * * *